Aug. 26, 1969       W. R. DOLLASE       3,464,061
COMBINED LIGHT FLASHER AND TURN SIGNAL FOR A VEHICLE
Filed March 25, 1968
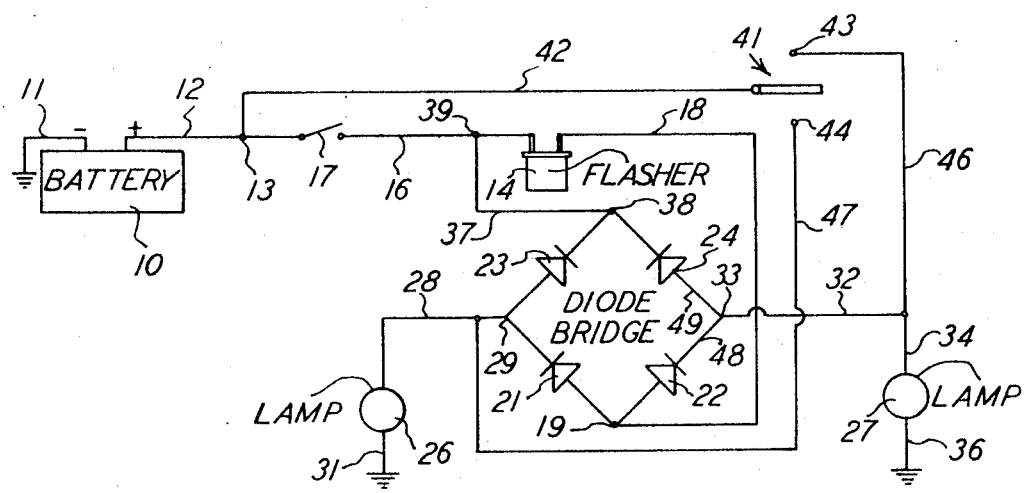
INVENTOR:
WILLIAM R. DOLLASE
ATTORNEY United States Patent Office 3,464,061
Patented Aug. 26, 1969

3,464,061
COMBINED LIGHT FLASHER AND TURN
SIGNAL FOR A VEHICLE
William R. Dollase, Racine, Wis., assignor to J. I. Case
Company, Racine, Wis., a corporation of Wisconsin
Filed Mar. 25, 1968, Ser. No. 715,867
Int. Cl. B60q 1/46
U.S. Cl. 340—81          4 Claims

ABSTRACT OF THE DISCLOSURE

A combined light flasher and turn signal for a vehicle, including a battery, flasher means, gating components, a switch system, and lamps, all electrically connected together. These electric components permit the signal lamps to flash in unison, for indicating a slow moving or parked vehicle, and secondly they provide for converting the condition of having two lamps flashing to a condition of having one lamp flashing while the other lamp is constantly energized in a non-flashing condition, and thirdly they provide for converting from a condition where neither lamp was neither flashing nor being constantly energized, to a condition of one lamp flashing while the other lamp is being constantly energized.

Background of the invention

This invention relates to a combined light flasher and turn signal for a vehicle.

The invention has particular application in tractors, or other vehicles which move slowly along the highway. It is an important safety feature to have signal lamps on the vehicle so that the lamps may be flashing, by being intermittently electrically energized, to signal that the vehicle is parked, moving slowly, or any other reason for indicating its presence. Of course these lamps are commonly mounted on the rear of the vehicle at the left and right sides thereof, and they may also be located on the front of the vehicle at the left and right sides thereof.

Further, it is desirable to have the lamps arranged so that they will indicate a direction of turning the vehicle, such as the electrically energized left and right vehicle turn signals.

In these systems, it is desirable to have the electric system capable of having the lamps flashing in unison, or together, to indicate the slow moving or parked tractor or the like. Further, it is desirable that, when the lights are flashing together, the electrical components be capable of immediate conversion to where the left and right turn signals may be energized to indicate the vehicle is going to turn either to the left or to the right. In the disclosed embodiment of this invention, the conversion from the flashing light condition to the turning light condition is achieved by having the lamp on the right side constantly energized while the lamp on the left side remains flashing, to indicate the left turn.

Finally, it is a feature of the disclosed embodiment to have the electric components capable of indicating a left or right turn from a condition where the lights have not been previously flashing. That is, when the indicator lights are not operating, it is still desirable to be able to intermittently energize one of the lamps to show the intended turning of the vehicle, either to the left or right. In this condition, if a right turn is being signaled, then the lamp on the right side would be flashing, and the lamp on the left side would constantly be energized to be in a non-flashing but constantly illuminated condition.

The prior art is aware of electrical components and systems which provide for flashing indicator lights for the two purposes of indicating a parked or slowly moving vehicle and for indicating a turning of the vehicle. However, the prior art requires a complexity of electrical components to accomplish these signaling features, and the prior art may require a duplication of lamps to indicate the flashing-lamp condition and the turning-signal condition. Further, the prior art may require duplication of the flasher means, as well as a duplication of electric gating means in order to convert the circuit from the flashing condition to the turn-signal condition. Still further, the prior art may require a duplication of turn actuators or it may require a large number of electric contacts to provide the switching functions for the three indicator conditions mentioned heretofore.

Accordingly, the present invention provides a simplified electric system for achieving the three indicator conditions described, and it does so with a minimum of electric components, particularly flashing mechanism, electric contacts, gating means, and lamps. In this manner, fewer circuit points are available and therefore the entire circuit is more reliable and less subject to failure. Specifically, the present disclosure teaches the use of solid state devices, such as diodes, for improving the prior art circuits, as described heretofore.

The drawing schematically shows the electric components and their connections.

Description of the preferred embodiment

It will be clearly understood that the drawing shows a diagrammatic view of this combined light flasher and turn signal system which is useful in a tractor (not otherwise shown). Thus, a battery 10, which would be the battery commonly used for energizing the tractor, is shown to have its negative connection 11 extending to a ground point, as indicated. Also, a connection 12 extends from the positive terminal of the battery to a point indicated 13. An electric flasher 14 is connected to the battery 10 by means of the electric connection 12 and an electric connection 16 and a switch 17 which is shown in the open position in the drawing. Obviously, if the switch 17 were closed, then the flasher would be electrically energized by the battery 10, and electric current would flow through the flasher means 14 and would flow therefrom through the electric connection 18. The connection 18 is electrically connected to a diode bridge at a point 19, and the diode bridge is shown to include four diodes 21, 22, 23, and 24. These are conventional electric components of diodes, and they permit the flow of current only in the direction indicated by the arrow heads or triangles of each of the diodes, that is actually in the upward direction from the terminal or contact point 19.

Two electrical lamps 26 and 27 are mountable on the vehicle or tractor at the left and right hand sides of the tractor, with respect to the forwardly facing direction of the tractor. That is, it can be considered that the lamp 26 is the left hand lamp and the lamp 27 is the right hand lamp on the tractor. An electric connection 28 extends from a terminal 29 and to the lamp 26, which is grounded through the electric connection 31. Likewise, an electric connection 32 extends from the diode bridge terminal 33 and to the electric connection 34 connected to the lamp 27. An electric connection 36 extends from the lamp 27 and to the ground.

Finally, an electric connection 37 extends between the diode bridge terminal 38 and a terminal or point 39 on the electric connection 16, leading to the flasher means 14.

With this portion of the electric components described, it will be understood that when the switch 17 is in the closed position, current will flow from the battery 10 to the point 39 and down to the point 38. At this point, the diodes 23 and 24 preclude the current from flowing further in that direction. Thus, returning to the terminal 39, the current will continue to flow until it reaches the flasher 14 where the current is then converted to intermittent energy, by the well-known action of the common type of flasher 14. The current then continues through the electric connection 18 and reaches the diodes 21 and 22 from where it passes into the electric connections 28 and 32 to cause the lamps 26 and 27 to flash in unison.

This aforementioned condition is therefore the one where both the lamps 26 and 27 are flashing together to indicate the presence of the vehicle. From this flashing condition, it is desirable to have the system convertible to where a turning of the vehicle could be indicated. This condition of signaling the turn is achieved by having the left lamp 26 constantly energized while leaving the right lamp 27 intermittently energized, to signal a right turn, and vice versa.

To achieve this turning signal condition, a turn signal switch 41 is connected to the battery by the electric connection 42 extending between the terminal 13 and the switch 41. Two contact points 43 and 44 are included in the switch 41, and they are connected with electric connections 46 and 47, respectively. Of course the connections 46 and 47 extend to the electric connections 32 and 28, respectively, so they therefore extend to the lamps 26 and 27 and also to the diode bridge, as shown.

Thus, to signal a right turn when both lamps 26 and 27 are flashing, placing the turn signal switch 41 into a position of contacting the contact point 44 will cause the lamp 26 to be constantly energized, while the lamp 27 remains flashing to signal the right turn, as desired. To achieve this, even though the electric connection 47 extends to the diode bridge at the terminal 29, the diode 21 prevents the current from flowing to the terminal 19 and thus to the lamp 27. Also, while current could flow from the terminal 29 through the diode 23, it could not flow from the terminal 38 to the terminal 33, since the diode 24 prevents flow in that direction, and thus the lamp 27 cannot be constantly illuminated while the lamp 26 is constantly illuminated. Further, in this condition of signaling the right turn, and also in the condition of having both lamps flashing in unison, current will not flow between the points 38 and 39, since there is no theoretical potential difference between these two points since current has already flowed in the electric connection 16.

Finally, the system disclosed provides for the indication of a left turn and a right turn, even when the system was not in the flashing-in-unison condition. In fact, it is desirable to have the turn indicator system operable entirely independent of the flashing-in-unison system. Therefore, switch 17 is provided, and this switch is then set in the open position, as shown, when the flashing-in-unison condition is not desired. Therefore, with switch 17 open, current will flow to the switch 41, which may be placed in condition for closing with either contact point 43 or 44. Again observing a right turn signal, contact 44 would be closed to have current flow through the electric connection 47 and to the lamp 26 for constantly illuminating lamp 26. Current also reaches the diode bridge terminal 29 and is free to flow only through the diode 23, and not the diode 21. The current will continue to the terminal 38 and through the connection 37 and to the point or terminal 39, since there is now electric potential between the points 38 and 39. The current will then continue through the flasher 14, the electric connection 18, to the terminal 19, and through the diode 22, the electric connections 32 and 34, and finally to the lamp 27. The lamp 27 is thus placed in the flashing condition to indicate the right turn.

Conversely, to indicate a left turn, the contact point 43 is closed to have current flow through the electric connection 46 and the electric connection 34, to constantly illuminate or energize the lamp 27. Current continues through the electric connection 32 to the diode bridge terminal 33 and through the diode 24 and again through the electric connection 37 and flasher 14 and electric connection 18 to the terminal 19. From terminal 19, current will flow through the diode 21 and electric connection 28 to the lamp 26, to cause the lamp 26 to flash intermittently to indicate the left turn, as desired.

In this regard, the diode bridge has four sections, two of which permit the passing of current at one time, while the other two preclude the passing of current in a certain direction at that time. Further, the turn signal portion of the circuit described in connection with switch 41 is a by-pass of the sequence of passage of current with regard to the flashing-in-unison condition, so that the system can be used as a turn signal system even though the flashing-in-unison system was not then in use. Thus, where the switch 17 is closed and current is passed through the flasher 14 and the diode bridge, this is considered to be one branch of the system. Also, the diode bridge includes gating components for the passage of curent in one direction and the blocking of the flow of current in the opposite direction. The electric connection 42, switch 41, and the electric lines 46 and 47 connected therewith, are therefore considered to be a second branch of the electric circuit or system. The few switch contact points disclosed, including those in switches 17 and 41, permit the by-passing of the flasher 14 so that either lamp 26 or 27 can be placed in the continuous illuminated condition, while the other lamp remains flashing. The drawing lines, such as lines 48 and 49, extending between each two of the four diodes, represent electric lines or electric connections for the flow of current between the diodes.

What is claimed is:

1. In a combined light flasher and turn signal electric system, an electric battery, two lamps disposed in left and right hand positions for both intermittent flashing and constant energizing, an electric circuit connected between said battery and said two lamps, an electric switch system and electric flasher means and electric gating components electrically connected in said electric circuit for control of electric power between said battery and said two lamps, said flasher means and said gating components and said two lamps being electrically connected together in sequential series in said electric circuits to form a first branch of said electric circuit for intermittently passing electric current to said two lamps for flashing the latter in unison, said switch system including two contact points, said electric circuit also including a second branch electrically connected to said battery and including said two contact points and being electrically connected to said two lamps, electric connections in said second branch and having two separate sections extending from respective ones of said two contact points and with each of said sections being separately electrically connected between respective ones of said two lamps and said gating components, the improvement comprising said two contact points being in electrical by-pass of said flasher means from said battery for the selective constant flow of electric current to a selected one of said two lamps for a first condition of selectively constantly energizing said one lamp while the other lamp continues flashing by virtue of electric current flowing to said other lamp through said first branch, and with said gating components being electrically connected to said flasher means and having an electric component for achieving blocking the flow of current to said lamps in achieving a second condition which is the intermittent flow of electric current from said second branch to said other lamp for the flashing of said other lamp while no electric current is flowing to said lamps through said first branch.

2. The subject matter of claim 1, including an additional switch means in said first branch being electrically interposed between said battery and said flasher means at a point between said battery and the connection of said gating components to said flasher means for selective interruption of current flow direct from said battery to said flasher means.

3. In a combined light flasher and turn signal for a vehicle including an electric battery, two lamps disposed in left and right hand positions for both intermittent flashing and constant energizing, an electric circuit connected between said battery and said two lamps, electric flasher means and electric gating components electrically connected in said circuit for control of the intermittent flow of electric current between said battery and said two lamps for flashing of said lamps, the improvement comprising an electric switch system electrically interposed between said battery on the one side of said switch system and both said gating components and said lamps on the other side of said switch system, said switch system including two selective contact points, electric connections extending from each one of said two contact points and by-passing said flasher means and extending directly and respectively to said two lamps for constant separate energizing of the respective said lamps, said gating components including two diodes respectively electrically connected to each of said two contact points and with two of said diodes being electrically connected to said flasher means for separately passing electric current from each of said two contact points to said flasher means and then on to a respective one of said two lamps for flashing said lamp, and with the two other of said diodes being electrically connected to said contact points for blocking the flow of current to said flasher means.

4. The subject matter of claim 3, wherein said switch system includes an electric swtich point electrically interposed between said battery and said flasher means for passing electric current to said flasher means when neither of said two contact points is electrically closed, for flashing both said two lamps in unison.

References Cited
UNITED STATES PATENTS
3,040,207   6/1962   Grontkowski.

FOREIGN PATENTS
180,843   1/1955   Austin.

THOMAS A. ROBINSON, Primary Examiner

KENNETH N. LEINER, Assistant Examiner

U.S. Cl. X.R.
315—205